United States Patent
Smith et al.

(10) Patent No.: US 6,714,557 B1
(45) Date of Patent: Mar. 30, 2004

(54) PACKET CONCATENATION FOR INCREASED TRANSMISSION CAPACITY

(75) Inventors: Ronald P. Smith, Redondo Beach, CA (US); Harvey L. Berger, Redondo Beach, CA (US); Eric R. Wiswell, Torrance, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/087,724

(22) Filed: May 29, 1998

(51) Int. Cl.[7] .............................................. H04B 7/212
(52) U.S. Cl. ........................ 370/442; 370/350; 370/468
(58) Field of Search ................................ 370/442, 326, 370/329, 336, 337, 345, 347, 349, 350, 468, 443, 471, 498, 503, 509, 510, 512, 389, 392, 393, 458, 515; 375/219, 220, 293, 316, 356, 359, 368, 367; 455/39, 502, 515, 517

(56) References Cited

U.S. PATENT DOCUMENTS

| | | | |
|---|---|---|---|
| 3,649,764 A | 3/1972 | Maillet | 370/324 |
| 3,711,855 A | 1/1973 | Schmidt et al. | 342/353 |
| 3,772,475 A | 11/1973 | Loffreda | 370/324 |
| 3,778,715 A | 12/1973 | Schmidt et al. | 370/324 |
| 3,789,142 A | 1/1974 | Shimasaki et al. | 370/323 |
| 3,838,221 A | 9/1974 | Schmidt et al. | 370/324 |
| 4,204,093 A | 5/1980 | Yeh | 370/323 |
| 4,466,108 A | 8/1984 | Rhodes | 375/329 |
| 4,707,841 A | 11/1987 | Yen et al. | 375/230 |
| 5,677,908 A | * 10/1997 | Oura | 370/331 |
| 5,710,765 A | * 1/1998 | Lee et al. | 418/36 |
| 5,818,829 A | * 10/1998 | Raith et al. | 370/347 |
| 5,889,781 A | * 3/1999 | Eftimakis et al. | 370/509 |
| 6,002,710 A | * 12/1999 | Hendrickson et al. | 375/149 |
| 6,028,854 A | * 2/2000 | Raith et al. | 370/347 |
| 6,366,623 B1 | * 4/2002 | Dupuy | 375/340 |

* cited by examiner

*Primary Examiner*—Phirin Sam
(74) *Attorney, Agent, or Firm*—McAndrews, Held & Malloy, Ltd.

(57) ABSTRACT

A method of packet concatenation in TDMA transmission is provided. The method includes the step of transmitting from a terminal in a first time slot (202), including overhead information (108–112) and symbols representing terminal data (114). The method also includes the step of transmitting from a terminal (possibly the same terminal) in a subsequent time slot (204–208), including a subset of the overhead information (108–112) and symbols representing terminal data (114). The subsequent time slot may be a consecutive time slot. The overhead information may include, for example, guard time (110), ramp time beam settling time (108) and a preamble (112).

20 Claims, 1 Drawing Sheet

PACKET CONCATENATION FOR INCREASED TRANSMISSION CAPACITY

BACKGROUND OF THE INVENTION

The present invention relates to Time Division Multiplexed (TDM) communications. In particular, the present invention relates to techniques that increase the amount of information transmitted in a time slot by eliminating overhead information.

Modern communications networks carry vast amounts of information. The information is often transmitted serially in a Time Division Multiplexed (TDM) format in which information to or from many terminals (for example, cellular phones) is transmitted in a single channel (implemented, for example as a 30 Khz wide frequency band allocated from a larger spectrum). The time during which a given terminal may transmit (or receive) is generally referred to as a time slot. The duration of a time slot may, for example, be measured in bit periods, symbols, or chips.

Additionally, a satellite that forwards information to ground based users in a downlink beam may serially transmit the information in a time slot structure. Thus, a single transmitting source may also use a TDM format for transmitting data. Individual ground based terminals monitor the downlink beam, wait for the appropriate time slot, and extract their data. Systems that transmit information in time slots are generally referred to as Time Division Multiple Access (TDMA) systems.

In a TDMA system, bursts of data are transmitted in each time slot and there are a predefined number of time slots per frame. For example, the Telecommunications Industry Association (TIA) IS-54-B standard defines a six time slot frame. Each time slot is 162 symbols in length. An important consideration in a TDMA system is the alignment or synchronization of bursts so that overlap between transmissions (and therefore corrupted data) does not occur.

The individual time slots in each TDMA frame require overhead to allow for timing mismatch between the receiver and the transmitter or two transmitters belonging to various terminals. Thus, a guard time (during which no transmission occurs), is typically required in a time slot to prevent two transmitters with mismatched timing from transmitting simultaneously. A time slot may also incorporate overhead information to allow for circuit implementation issues such as synchronization and training (to allow a receiver to acquire the timing of a transmitted signal), or ramp up time (during which the transmitter ramps up to full transmitting power). The overhead information manifests itself as a predefined number of symbols or chips during which no terminal data may be transmitted. For example, in IS-54-B, a guard time of six symbols, a ramp up time of six symbols, and a synchronization time of 28 symbols are included as overhead information in each time slot. Thus, 40 of 162 symbols, nearly 25%, cannot be used to transmit terminal data.

Similarly, in satellite communications, a time slot, for example, 1925 chips in length, may require a beam settling time of 100 chips, a guard time of 750 chips, and a preamble (synchronization) time of 247 chips. The beam settling time is often associated with adjusting a transmitted waveform to a new coverage region, particularly when phased array antennas are used. In this example, over 36% of the bandwidth cannot be used to transmit terminal data.

In the past, attempts have been made to eliminate the synchronization portion (generally known as a preamble) of the overhead information in each time slot. The preamble of a time slot is generally used to synchronize the received signal sampling clock (using a phase locked loop or other tracking scheme) to the transmitter clock as manifested in the preamble. One approach to eliminating the preamble is disclosed in U.S. Pat. No. 4,707,841 to Yen, et al., entitled "Digital Data Receiver for Preamble Free Data Transmission". In Yen, a complicated signal processing structure is required to sample the received signal, recover symbols from the received signal, interpolate the recovered symbols, and produce digital data by decoding the recovered symbols. Thus, the well understood synchronization control associated with the preamble is eliminated. In most circumstances, this is undesirable because established communications systems require a preamble for synchronization. Thus, a time slot format that completely eliminates the preamble would be incompatible with many communication systems.

Another approach at eliminating preambles is found in U.S. Pat. No. 4,466,108 to Rhodes, entitled "TDMA/PSK Carrier Synchronization Without Preamble". In Rhodes, an additional reference waveform, a "pseudo-coherent reference", is required that has the same frequency as the carrier used to transmit the symbols. The reference waveform is controlled by a voltage controlled oscillator and is directly connected to a mixer for demodulation of the received waveform. Thus, no preamble is needed in the system disclosed by Rhodes. Rhodes therefore repeats the shortcoming of Yen with respect to established systems requiring a preamble.

Furthermore, neither Rhodes nor Yen suggest eliminating other types of overhead information in a TDMA frame. As noted above, each piece of overhead information in a TDMA frame lowers the transmission efficiency, inasmuch as time and power is used for purposes other than user information.

A need has long existed in the industry for a more efficient method of transmitting information in TDMA format.

BRIEF SUMMARY OF THE INVENTION

It is an object of the present invention to increase the amount of transmitted user information in TDMA time slots.

It is an object of the present invention to eliminate or minimize overhead information, including preambles, in TDMA time slots.

It is another object of the present invention to periodically reinsert preambles in TDMA time slots to reestablish timing synchronization.

It is yet another object of the present invention to allow a terminal to transmit more data in multiple sequential time slots than is typically possible in individual separated time slots.

The present invention provides a method for packet concatenation in TDMA transmission. The method includes the steps of transmitting from a terminal, in a first time slot, overhead information and symbols representing terminal data. Additionally, the terminal transmits, in a subsequent time slot, only a subset of the previously transmitted overhead information and additional symbols representing terminal data. The additional symbols are transmitted in place of the subset of overhead information eliminated in the subsequent time slots. The terminal also reinserts a subset of the eliminated overhead information in a further time slot transmitted after the subsequent time slots. The further time slot may, for example, reinsert a preamble that was eliminated in the subsequent time slots.

The terminal data may include any type of information, for example, encoded voice samples for telephony users or digital fax or modem data. The overhead information may include, for example, a synchronization preamble, guard time, ramp time, or beam settling time. It is noted that overhead information generally refers to transmission of symbols, or transmission free time (for example, guard time), used for other than terminal data. In one or more subsequent time slots, the first user does not repeat certain portions of the overhead information (for example, guard time may be eliminated). Thus, only a subset of overhead information (which is, in many cases, no overhead information) is repeated in the subsequent time slot. The subsequent time slot may be a time slot consecutive with the first time slot.

DETAILED DESCRIPTION OF THE INVENTION

Figure 1:
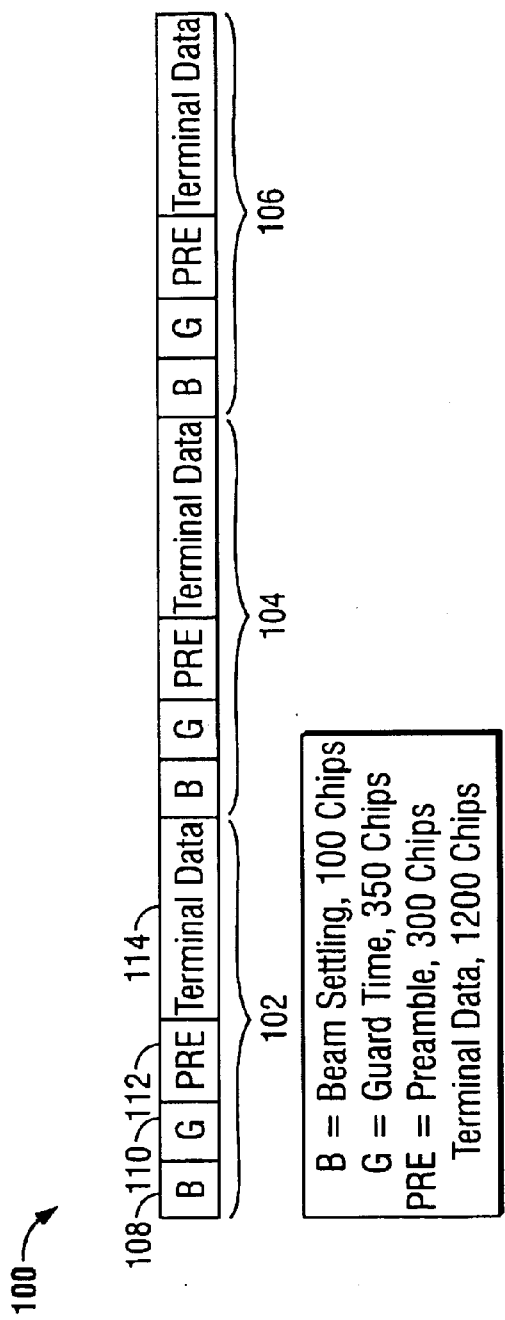
FIG. 1 illustrates three consecutively transmitted time slots, where each time slot includes overhead information and terminal data.

Turning now to FIG. 1, that Figure illustrates a TDMA transmission 100 of three consecutive time slots (a first time slot 102, a second time slot 104, and a third time slot 106). Each time slot 102–106 includes overhead information including beam settling time (B) 108, guard time (G) 110, and a preamble (PRE) 112. Other types of overhead information, not shown, may also be present, for example, ramp up time. Also included in each time slot 102 is terminal data 114.

In the particular example of FIG. 1, the beam settling time 108 is 100 chips in duration, the guard time (G) 110 is 350 chips in duration, and the preamble (PRE) 112 is 300 chips in duration. The terminal data 114 is 1200 chips in duration. Each of the time slots 102–106 is therefore 1950 chips in duration. The precise duration of each type of overhead information or terminal data may, of course, vary considerably.

Each of the time slots 102–106 may be transmitted by individual users, for example, telephony users. Typically, a single user is responsible for transmitting (or receiving) a single time slot. However, a single user could conceivably transmit any of time slots 102–106. Additionally, in certain situations, the entire sequence of time slots 102–106 may be generated by a single source. As an example, a satellite responsible for handling communications for a multitude of ground based terminals may generate a single transmit stream containing all of the time slots 102–106 in a downlink beam.

Figure 2:
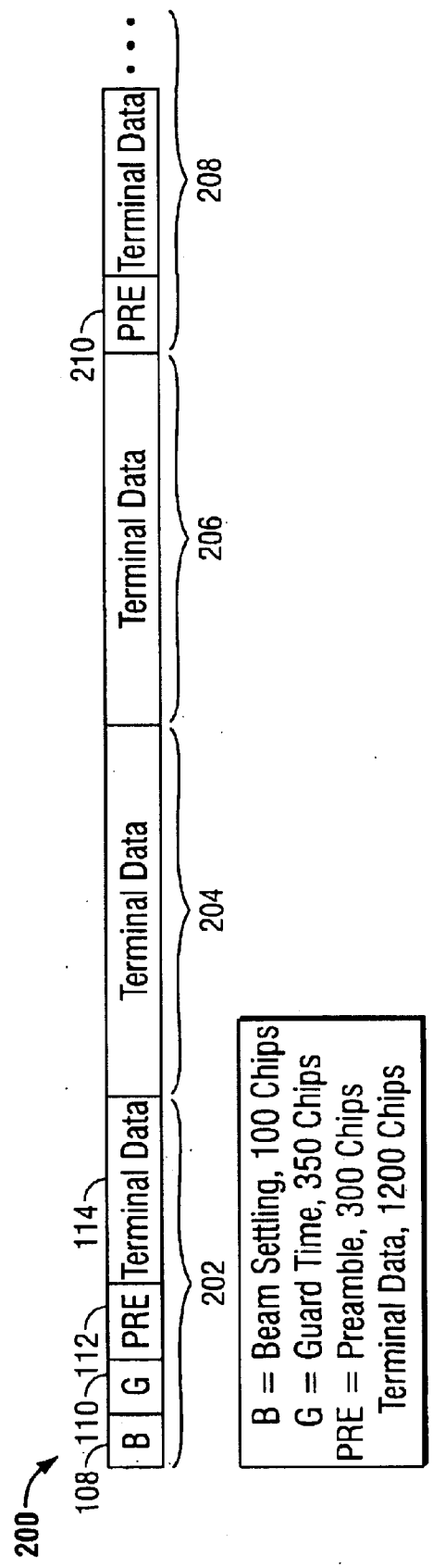
FIG. 2 illustrates concatenated packet transmission of terminal data that enhances the efficiency of TDMA transmission by eliminating overhead information.

Turning now to FIG. 2, that figure shows concatenated packet transmission 200 of terminal data. Four time slots are indicated in FIG. 2, a first time slot 202, a second time slot 204, a third time slot 206, and a fourth time slot 208. As with the first time slot 102 in FIG. 1, the first time slot 202 in FIG. 2 includes overhead information including beam settling time (B) 108 which is 100 chips in duration, guard time (G) 110 which is 350 chips in duration, and a preamble (PRE) 112 which is 300 chips in duration. Also included in the first time slot 202 is terminal data 114 which is 1200 chips in duration. The length of each time slot 202–208 remains the same as the original time slots 102–106 in FIG. 1, 1950 chips in duration.

Note however, that each time slot 204–208 eliminates a subset of overhead information. In particular, the second time slot 204 and third time slot 206 eliminate all overhead information, while the fourth time slot 208 eliminates only guard time 110 and beam settling time 108 overhead information. Because the second time slot 204 and the third time slot 206 are able to eliminate overhead information, the second time slot 204 and third time slot 206 may transmit additional terminal data in an amount equal to the amount of eliminated overhead information (B+G+PRE=750 Chips).

The second time slot 204 and third time slot 206 may be considered to contain one 1200 chip packet terminal data 114 in addition to an extra 750 chips of terminal data packet. A 62.5% efficiency increase results from transmitting 1950 chips of terminal data rather than 1200 chips of terminal data. The elimination of overhead information in subsequent time slots is discussed in more detail below.

Beam settling time 108 is generally required to allow a receiver to position, reposition, or otherwise adjust to an incoming communications waveform (for example, an uplink signal) from a source transmitter. Thus, in situations where a transmitter first sends data to a receiver, beam settling time may be necessary. For subsequent transmissions, for example consecutive time slots, the receiver may not require additional beam settling time because the receiver has already adjusted to the communications waveform in the first time slot. Beam settling time may therefore be eliminated without detrimental effect in subsequent time slots.

Guard time 110 is generally provided to prevent two independent terminals from simultaneously. Thus, when a single terminal will transmit several consecutive time slots, guard time is not necessary for the transmitting terminal after the first time slot (to avoid potential overlapping transmission with the previous time slot). Similarly, ramp up time (during which a transmitter reaches full transmitting power) need not be repeated when a single terminal continues to transmit in consecutive time slots.

It is noted that guard time 108 and beam settling time 110 may actually be implemented, for example, as periods of transmission free time (i.e., no symbol transmission occurs). As noted above, guard time 108 and beam settling time 110 are considered overhead information. Transmitting a subset of overhead information may therefore include eliminating transmission free time for guard time 108 or beam settling time 110. As a result, terminal data may be transmitted in what normally would be the transmission free time allocated in a time slot.

Again with reference to the second time slot 204 and third time slot 206, note that the transmission of the preamble 112 has also been eliminated. The preamble is generally implemented as a predefined pattern of bits known to the transmitter and the receiver. The receiver recognizes the received bit pattern to synchronize its local clocks or oscillators to the transmitted clock, thereby providing an accurate time source for demodulation and decoding of the data in the time slot.

Modern clocks and oscillators provide extremely stable timing references once adjusted to their desired frequencies. Thus, once a receiver's clock is synchronized to a transmitter's clock, it is generally not necessary to resynchronize until a substantial period of time has elapsed (for example 8 or more time slots which may span hundreds of microseconds). Thus, a terminal may transmit a first time slot with a preamble, then eliminate the preamble in several subsequent time slots. The terminal may eliminate the preamble until a predetermined number of time slots has elapsed. The number of time slots transmitted before reinserting a preamble may be determined, for example, by evaluating the known frequency error and drift in the receiver and in the transmitter oscillators, as well as the doppler between the transmitter and receiver. The amount of time (and therefore the number of time slots) before the timing mismatch between the transmitter and receiver exceeds a predetermined threshold (e.g., 0.2 chip or symbol) may then determine when the next preamble is transmitted.

Thus, the preamble may be eliminated for many subsequent time slots (which may not be consecutive, necessarily). Then, after transmission of the preamble free time slots, a terminal may reinsert a preamble to help the receiver resynchronize its oscillator. The fourth time slot in FIG. 2 shows that a terminal has reinserted a preamble 210 in its time slot. Note that the transmitter still eliminates guard time 110 and beam settling time 108.

In order for a receiver, or transmitter, to know how much overhead information and how much user information to expect in each slot, associated control data may be passed, for example, as part of the terminal data, or as dedicated control data representing additional overhead information in a time slot. The control data may also be passed through an independent communications mechanism that does not use time slots, or may even be preprogrammed at transmitters and receivers according to a pre-established transmission algorithm. Such an algorithm may indicate that a transmitter will always transmit at least three consecutive time slots excluding a subset of overhead information.

Table 1, below, shows an example of the benefits that may be achieved with the present invention. Assuming a beam settling time of 100 chips, a guard time of 350 chips, and a preamble time of 300 chips, the performance increase is computed for the indicated numbers of transmitted time slots. Guard time and beam settling time is provided for only once, in the first time slot, while a preample is provided once every eight consecutive time slots. Packets of terminal data are assumed to occupy 1200 chips in the first time slot, while, in subsequent time slots, additional terminal data chips replace the eliminated overhead. As an example, after 32 time slots have been transmitted in a conventional system, 32 * 1200=38,400 chips of terminal data has been transmitted. In the packet concatenated system of the present invention, a total of 60,750 chips of user information is transmitted in 32 time slots. A 58.2 percent increase in transmitted terminal data is therefore realized.

TABLE 1

| Total time slots | Total chips of overhead information | Total chips of terminal data | Percentage increase in terminal data |
|---|---|---|---|
| 1 | 750 | 1200 | 0 |
| 8 | 750 | 14,850 | 54.7 |
| 9 | 1050 (preamble) | 16,500 | 52.8 |
| 16 | 1050 | 30,150 | 57.0 |
| 17 | 1350 | 31,800 | 55.9 |
| 24 | 1350 | 45,450 | 57.8 |
| 25 | 1650 | 47,100 | 57.0 |
| 32 | 1650 | 60,750 | 58.2 |
| 33 | 1950 | 62,400 | 57.6 |
| 40 | 1950 | 76,050 | 58.4 |

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications as incorporate those features that come within the spirit and scope of the invention.

What is claimed is:

1. A method of packet concatenation in TDMA transmission, said method comprising:

(a) transmitting from a first time slot including overhead information and symbols representing first terminal data, said overhead information including synchronization information;

(b) transmitting from said terminal at least one subsequent time slot, said at least one subsequent time slot excluding a subset of said overhead information and including symbols representing additional terminal data, wherein said subset includes all said synchronization information; and (c) transmitting, after said at least one subsequent time slot, from said terminal a further time slot reinstating a subset of said overhead information.

2. The method of claim 1, wherein said subsequent time slot is a consecutive time slot.

3. The method of claim 2, wherein said first time slot includes preamble symbols.

4. The method of claim 3, wherein said subsequent time slot excludes preamble symbols.

5. The method of claim 3, wherein said subsequent time slot excludes terminal data free time for guard time overhead information.

6. The method of claim 4, wherein said first time slot provides terminal data free time for guard time overhead information.

7. The method of claim 4, further comprising the step of transmitting, to said terminal, the number of time slots for which it will transmit according to step b).

8. The method of claim 6, wherein said subsequent time slot excludes terminal data free time for guard time overhead information.

9. The method of claim 2, wherein said first time slot provides terminal data free time for guard time overhead information.

10. A method of packet concatenation in TDMA transmission, said method comprising:

(a) transmitting from a terminal a first time slot including overhead information and symbols representing first terminal data said overhead information including synchronization information;

(b) transmitting from said terminal at least one subsequent time slot, said at least one subsequent time slot excluding a subset of said overhead information and including symbols representing additional terminal data, wherein said subset includes at least a portion of said synchronization information; and (c) transmitting, after said at least one subsequent time slot, from said terms a further time slot reinstating a subset of said overhead information, wherein said subsequent time slot is a consecutive time slot, wherein said first time slot includes preamble symbols, wherein said subsequent time slot excludes preamble symbols, and wherein said first time slot provides terminal data free time for beam settling time overhead information.

11. A method of packet concatenation in TDMA transmission, said method comprising:

(a) transmitting from a terminal a first time slot including overhead information and symbols representing first terminal data, said overhead information including synchronization information;

(b) transmitting from said terminal at least one subsequent time slot, said at least one subsequent time slot excluding a subset of said overhead information and including symbols representing additional terminal data, wherein said subset includes at least a portion of said synchronization information; and (c) transmitting, after said at least one subsequent time slot, from said terminal a firer time slot reinstating a subset of said overhead information, wherein said subsequent time slot is a consecutive time slot, wherein said first time slot includes preamble symbols, wherein said subsequent time slot excludes preamble symbols, wherein said first time slot provides terminal data free time for beam settling time overhead information, and wherein said subsequent time slot excludes terminal data free time for beam settling time overhead information.

12. A method of packet concatenation in TDMA transmission, said method comprising:

(a) transmitting from a terminal a first time slot including overhead information and symbols representing first terminal data, said overhead information including synchronization information;

(b) transmitting from said terminal at least one subsequent time slot, said at least one subsequent time slot excluding a subset of said overhead information and including symbols representing additional terminal data, wherein said subset includes at least a portion of said synchronization information; and (c) transmitting, after said at least one subsequent time slot, from said terminal a further time slot reinstating a subset of said overhead information, wherein said subsequent time slot is a consecutive time slot, and wherein said first time slot provides terminal data free time for beam settling time overhead information.

13. A method of packet concatenation in TDMA transmission, said method comprising:

(a) transmitting from a terminal a first time slot including overhead information and symbols representing first terminal data, said overhead information including synchronization information;

(b) transmitting from said terminal at least one subsequent time slot, said at least one subsequent time slot excluding a subset of said overhead information and including symbols representing additional terminal data, wherein said subset includes at least a portion of said synchronization information; and (c) transmitting, after said at least one subsequent time slot, from said terminal a further time slot reinstating a subset of said overhead information wherein said subsequent time slot is a consecutive time slot, wherein said first time slot includes preamble symbols, and wherein said subsequent time slot excludes terminal data free time for beam settling time overhead information.

14. The method of claim 13, wherein said subsequent time slot excludes terminal data free time for guard time overhead information.

15. The method of claim 14, wherein said subsequent time slot excludes preamble symbols.

16. A method of packet concatenation in TDMA transmission, said method comprising:

(a) transmitting tom a terminal a first time slot including overhead information and symbols representing first terminal data, said overhead information including synchronization information;

(b) transmitting from said terminal at least one subsequent time slot, said at least one subsequent time slot excluding a subset of said overhead information and including symbols representing additional terminal data, wherein said subset includes at least a portion of said synchronization information; and (c) transmitting, after said at least one subsequent time slot, from said terminal a further time slot reinstating a subset of said overhead information, wherein said subsequent time slot is a consecutive time slot, wherein said first time slot includes preamble symbols, wherein said subsequent time slot excludes preamble symbols, and further comprising the step of transmitting time slots according to step b) until a predetermined timing mismatch is exceeded between said terminal and a receiver.

17. A method of packet concatenation In TDMA transmission, said method comprising:

(a) transmitting from a terminal a first time slot including overhead information and symbols representing first terminal data;

(b) transmitting from said terminal at least one subsequent time slot, said at least one subsequent time slot excluding a subset of said overhead information and including symbols representing additional terminal data; and (c) transmitting, after said at least one subsequent time slot, from said terminal a further time slot reinstating a subset of said overhead information, wherein said subsequent time slot is a consecutive time slot and wherein said first time slot includes preamble symbols and wherein said subsequent time slot excludes preamble symbols and further comprising the step of transmitting time slots according to step (b) until a predetermined timing mismatch is exceeded between said terminal and a receiver.

18. A method of packet concatenation in TDMA transmission, said method comprising:

(a) transmitting from a terminal a first time slot including overhead information and symbols representing first terminal data;

(b) transmitting from said terminal at least one subsequent time slot, said at least one subsequent time slot excluding a subset of said overhead information and including symbols representing additional terminal data; and (c) transmitting, after said at least one subsequent time slot, from said terminal a further time slot reinstating a subset of said overhead information, and (d) transmitting time slots according to step (b) until a predetermined timing mismatch is exceeded between said terminal a receiver.

19. A method for providing a variable data transmission rate, said method comprising the steps of:

transmitting a first time slot, wherein said first time slot includes both an overhead field and a data field; and transmitting N number of time slots including a data field and eliminating at least a portion of said overhead field, wherein N is dynamically variable, and wherein said transmitting N number of slots step includes dynamically varying N based on a timing mismatch between a transmitter and a receiver.

20. A variable data transmission rate communication system, said system including:

a transmitter transmitting a sequence of time slots, said sequence including:

a first time slot, wherein said first time slot includes both an overhead field and a data field; and N additional time slots wherein said N time slots include a data field and eliminate at least a portion of said overhead field, wherein N is dynamically variable, wherein said transmitter dynamically varies N based on a timing mismatch between said transmitter and a receiver.

* * * * *